(12) United States Patent
Schmerler

(10) Patent No.: US 11,001,034 B2
(45) Date of Patent: *May 11, 2021

(54) SYSTEM AND METHODS FOR EMBEDDING A COMMUNICATION DEVICE INTO CARBON FIBER STRUCTURES

(71) Applicant: Jurgen Schmerler, San Diego, CA (US)

(72) Inventor: Jurgen Schmerler, San Diego, CA (US)

(73) Assignee: Verifir, Inc., Solana Beach, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/931,115

(22) Filed: May 13, 2020

(65) Prior Publication Data

US 2020/0307152 A1 Oct. 1, 2020

Related U.S. Application Data

(60) Continuation-in-part of application No. 16/280,137, filed on Feb. 20, 2019, now abandoned, which is a
(Continued)

(51) Int. Cl.
*B32B 7/02* (2019.01)
*B32B 9/00* (2006.01)
(Continued)

(52) U.S. Cl.
CPC .............. *B32B 7/02* (2013.01); *B32B 9/007* (2013.01); *B32B 17/04* (2013.01);
(Continued)

(58) Field of Classification Search
CPC .......... B32B 7/02; B32B 9/007; B32B 17/04; B32B 2305/342; B32B 2307/206; B62J 45/40; B62K 19/02
(Continued)

(56) References Cited

U.S. PATENT DOCUMENTS 10,252,489 B2 * 4/2019 Schmerler ............... B32B 17/04
2006/0255945 A1 * 11/2006 Egbert ............. G06K 19/07749
340/572.7
(Continued)

OTHER PUBLICATIONS

An undated article, "Ferrite World vol. 11 Radio wave absorbers, anechoic chambers, and ferrite" provided at https://www.tdk.com/tech-mag/ferrite02/011—Publication date listed as 2020 * Note, this document is used as a teaching reference and not as prior art, and so a date is not required in this instance.*

*Primary Examiner* — Daniel A Hess
(74) *Attorney, Agent, or Firm* — David B. Waller

(57) ABSTRACT

A remote frequency communication device and method of embedding the device into a physical product build from carbon fiber materials whereby the communication device can interact with an interrogation device such as a mobile phone or tablet. The method provides steps to layer the communication device in a way that prevents the conductive carbon fiber material from short-circuiting the electro-magnetic field of the interrogating device by integrating insulating and protective layers around the communication device.

4 Claims, 6 Drawing Sheets

Related U.S. Application Data division of application No. 15/705,206, filed on Sep. 14, 2017, now Pat. No. 10,252,489.

(60) Provisional application No. 62/394,613, filed on Sep. 14, 2016.

(51) Int. Cl.
*B32B 17/04* (2006.01)
*B62J 45/40* (2020.01)
*B62K 19/02* (2006.01)

(52) U.S. Cl.
CPC ... *B32B 2305/342* (2013.01); *B32B 2307/206* (2013.01); *B62J 45/40* (2020.02); *B62K 19/02* (2013.01)

(58) Field of Classification Search
USPC .......................................................... 235/488
See application file for complete search history.

(56) References Cited

U.S. PATENT DOCUMENTS

| | | | |
|---|---|---|---|
| 2007/0273532 A1* | 11/2007 | Martin | G06K 19/04 340/572.7 |
| 2009/0015431 A1* | 1/2009 | Hamedani | G06K 19/07771 340/8.1 |
| 2017/0068437 A1* | 3/2017 | Warren | G06F 3/0443 |

* cited by examiner

SYSTEM AND METHODS FOR EMBEDDING A COMMUNICATION DEVICE INTO CARBON FIBER STRUCTURES

CROSS-REFERENCE TO RELATED APPLICATIONS

This application is a continuation-in-part application that claims the benefit of priority to divisional patent application Ser. No. 16/280,137 filed 20 Feb. 2019, patent application Ser. No. 15/705,206 filed 14 Sep. 2017 now U.S. Pat. No. 10,252,489 and provisional patent application Ser. No. 62/394,613, entitled "System and Method for Embedding a Communication Device into Carbon Fiber Structures" filed Sep. 14, 2016, which are incorporated by reference herein in their entirety.

STATEMENT REGARDING FEDERALLY SPONSORED RESEARCH OR DEVELOPMENT

Not applicable

THE NAMES OF THE PARTIES TO A JOINT RESEARCH AGREEMENT

Not applicable

INCORPORATION-BY-REFERENCE OF MATERIAL SUBMITTED ON A COMPACT DISC

Not applicable

TECHNICAL FIELD

The invention generally relates to the connection of physical objects to wireless communication devices via systems of integrated circuits and antennas using remote frequency. Communication and follow-up of interactions between physical objects, object users, and Internet services can add enormous value to the usefulness of the physical object, such as a product or product sample, for example.

BACKGROUND OF THE INVENTION

With the ability of cheaper technologies to connect computing devices to the internet, many attempts have appeared recently to connect more and more devices online. Beyond traditional client computers and servers, the Internet connects today many other forms of computing devices, such as cell phones, tablet computers, and printers. Beyond these wired or wireless connections, many manufacturers are trying to provide added value to their products by connecting them online. Examples include thermostats, temperature and weather stations, door locks, cameras, and even refrigerators. These types of connections are commonly referred to as the "Internet of Things" (IoT) and typically use WiFi and/or Ethernet networks in homes and businesses. Alternative connectivity technologies include Bluetooth, fixed wiring, Remote Frequency (RF) connections with dedicated hubs, or cellular networks.

Most recently, the broad availability of RFID technologies, in particular Near Field Communication, or NFC, in most commercial cellular phones, combined with a low cost factor, made NFC one of the most prominent alternatives to connect physical objects to communication devices, such as cellular phones.

While commercial NFC circuits and antennas, or NFC tags, can be easily applied to most materials products are made of, they face technical difficulties if the materials adjacent to the antenna competes with the antenna to conduct the electro-magnetic field of the external interrogating communication device, such as a cell phone. These materials include conductive metals and conductive carbon fiber structures.

This invention teaches how to embed the communication device, such as an RFID tag, with a carbon fiber-based material without the existing draw backs that lead to inability to use or severe performance loss of the communication device. Further the invention is a communication device containing a near field communication chipset or radio frequency identification chipset that may be read by an interrogation device, an antenna connected to the near field communication chipset or radio frequency identification chip set, a carrier film, on which the near field communication chip set or radio frequency identification chip set and antenna are provided and an insulation layer on which this carrier film is mounted.

SUMMARY OF THE INVENTION

The present invention is a communication device containing a near field communication chipset or radio frequency identification chipset that may be read by an interrogation device, an antenna connected to the near field communication chip set or radio frequency identification chipset, a carrier film, on which the near field communication chipset or radio frequency identification chipset and antenna are provided and an insulation layer on which this carrier film is mounted. The invention further provides methods for the implantation or embedding of this communication device into physical objects made of a variety of materials including conductive and non-conductive materials. The present invention is particularly beneficial when these materials adjacent to the antenna of the device are conductive and are able to compete with the communication devices antenna to conduct the electro-magnetic field of the external interrogating system. This interferes with the ability to identify, monitor or track the embedded communication device. The construction of the present communication device reduces or prevents this interference allowing for easy identification when interrogated.

In one embodiment the communication device may further contain a protective layer so that it may be maybe flush mounted on a carbon fiber object. This layer may be made of a material having a low electromagnetic shielding capability. For example, this material may be a resin-infused fiber wherein the fiber may be carbon fiber, glass fiber, biofiber, cotton fiber, synthetic polymer fiber, or cellulose fiber.

In another embodiment the communication device utilizes near field communication (NFC) radio frequency. The NFC radio frequency may be about 13.5 MHz.

The device is self-contained, provided in a single unit that may be implanted or embedded in a variety of physical objects; those of significant value may be particularly preferred. Examples of these objects include carbon fiber bicycles, golf clubs, skis or snow boards and other types of sporting equipment. It may be implanted or embedded in guns, rifles or other types of weapons. The device may also be implanted or embedded in new or used items for sale commercially or in antiquities. The device may also be utilized in mass produced items, or with large numbers of items that are identical or appear to be identical to distinguish one of those items from the others. The item in which the device may be implanted or embedded is up to the user's imagination and desired purpose.

DETAILED DESCRIPTION OF THE INVENTION

Embodiments of the invention are illustrated by way of examples and not by way of limitation in the figures of the accompanying drawings in which like references indicate similar elements. It should be noted that references to "an" or "one" or "some" embodiment(s) in this disclosure are not necessarily to the same embodiment, and such references mean at least one. Additionally, in the following description of exemplary embodiments, reference is made to the accompanying drawings which form a part hereof, and in which it is shown by way of illustration of specific embodiments in which the invention may be practiced. It is to be understood that other embodiments may be utilized and structural changes may be made without departing from the scope of the preferred embodiments of the invention.

Definitions

The term "provide", "provides", provided" and "providing" as used herein refers to a physical or function (ability) aspect being supplied by one element to another element of the device. For example, the insulation layer has the ability to reduce the interference from the material that the object, in which the device is embedded or implanted, is made of with the communication device's antenna when interrogated, thereby providing an insulation ability. Alternatively, the carrier film may be utilized to support the near field communication chip set and antenna thereby providing a support platform for these elements of the device.

The term "connect", "connects", "connected" and "connecting" as used herein refers to the joining of one element of the invention to another element of the invention by a variety of methods. For example, the antenna is joined via and electronic connection to the near field communication chipset or wherein the carrier film containing the near field communication chipset and antenna are mounted by adhesive to the insulation layer.

Figures 3A, 3B:
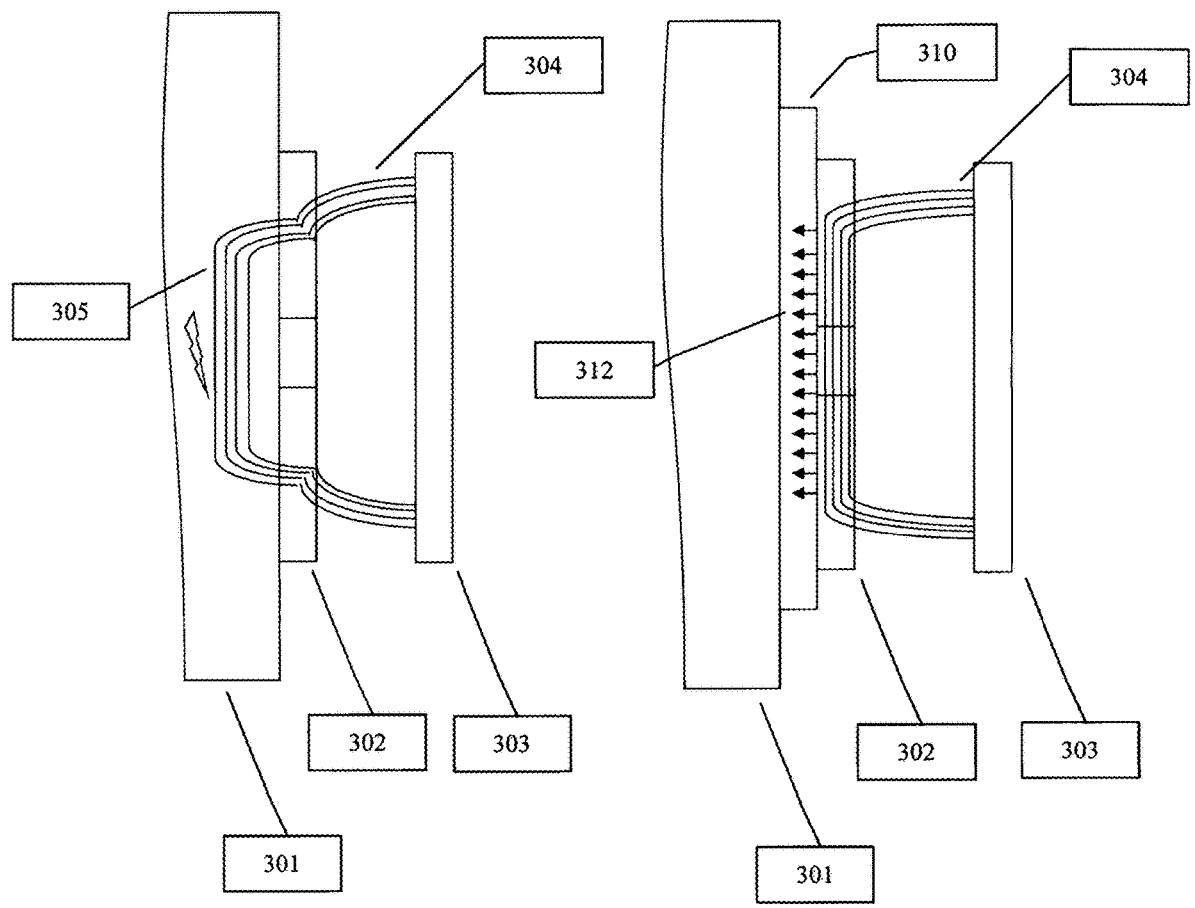
FIGS. 3A and 3B illustrate how an electro-magnetic field used for remote frequency communication is short circuited and how it can be prevented.

This invention addresses the process of embedding a communication device 302, such as an RFID or NFC chip set, into products that consist of layers of carbon fibers 301. It addresses the problem of short-circuiting (see FIG. 3A) such devices' electromagnetic fields 304 due to the conductive properties of carbon fibers 301.

The invention was conceived while developing methods to attach and embed NFC chipsets to carbon-based materials, such as carbon bicycle frames. A simple attachment on top or inside carbon fibers would result in short circuiting 305 of an electromagnetic field built by an interrogating device 303, resulting in insufficient signal strength and power supply to the communication device 302.

The application of such embedded communication devices is, for instance, an anti-counterfeiting system, where the communication device contains a memory chipset and a metal antenna with product identity information that can be read by a cell phone with NFC reading capabilities.

This invention addresses several shortcomings of current state-of-the-art methods in a specific environment:
1. carbon fibers react to electro-magnetic fields very much like metals. A field is short-circuited 305 by the material 301 that carries the communication device and its antenna 302;
2. to prevent the short-circuiting (see FIG. 3B), an additional insulation layer 310, of for instance a non-conductive poly-carbonate or ferrite, has to be inserted between the carbon carrier material 301 and the communication antenna 302; and
3. the resulting build-up of insulation layer 310, communication device 302 and protective materials would protrude above the carbon-based product, making it undesirable in terms of product fit (integration), integrity of additional coatings, optical form factors, or adherence of the communication device to the product.
4. conductive materials are not suitable as protective layers if used in common thicknesses, but we found that even conductive materials can be used if sufficiently thin and its mesh sufficiently spaced.

Figure 5:
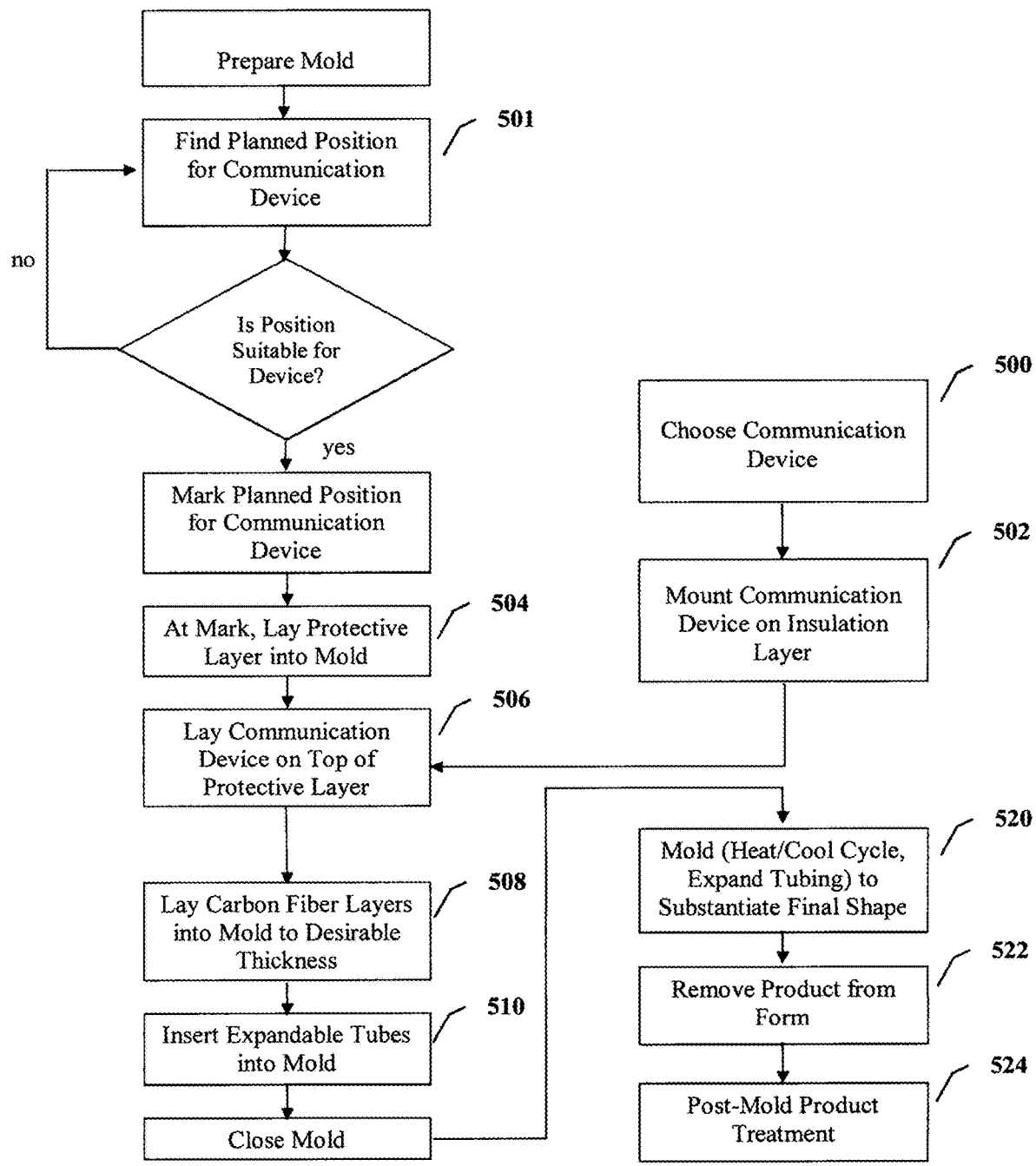
FIG. 5 is a process flow diagram, in accordance with one embodiment of the invention.

This invention includes a method of integrating the communication device under the surface of the final carbon-based form, while insulating the antenna, during the manufacturing process (see FIG. 5). Specific problems are solved with regard to carbon forming, curing temperatures and times, as well as chipset protection. However, it is important to note that the device is self-contained and may be held in place by a variety of methods known to those skilled in the art. In particular, the device may be held in place by a method that does not create a layer (e.g., a resin-infused fiber overlay) over the communication device, but may be merely the use of an adhesive between the object and the insulation layer of the communication device. Alternatively, the communication device may be covered by a material such as an adhesive tape, resin or a resin-infused fiber. The resin-infused fiber may include carbon fiber, glass fiber, biofiber, cotton fiber, synthetic polymer fiber, or cellulose fiber. The use of such a layer may be for esthetic purposes but is not required for the operation of the communication device.

The system and method described in this application consists of multiple elements:

Near Field Communication Components

First, a communication device is chosen with regard to final product form factors, desired reading device (e.g., an interrogator) capabilities, and read ranges 500. In one embodiment, the NFC components include can comprise an NFC IC chip, such as NTAG213 or a chip with similar capability, and a coiled or printed metal antenna on a carrier film.

Insulation Layer

Second, the carrier film containing the NFC components is mounted on an insulation layer of a non-conductive material, like ferrite, the area and thickness derived from final product form requirements and readability requirements 502. In one embodiment, the insulation material is a high frequency absorbing, 0.25 mm thick ferrite sheet with high permeability. This sheet may be provided in a variety of thicknesses and may be routinely tested by one skilled in the art to determine the desired shielding. For example, the thickness may range from about 1.00 mm to about 0.05 mm or about 0.90 mm, about 0.80 mm, about 0.75 mm, about 0.70 mm, about 0.65 mm, about 0.60 mm, about 0.55 mm, about 0.50 mm, about 0.45 mm, about 0.40 mm, about 0.35 mm, about 0.30 mm, about 0.25 mm, about 0.20 mm, about 0.15 mm, about 0.10 mm, or about 0.05 mm. The insulation layer 310 is suitable for absorbing frequencies used by the communication and interrogating devices, for instance 13.52 MHz in the case of NFC radio frequency. This permeability absorbs 312 the elements of the electromagnetic field that would otherwise short circuit 305 the interrogator 303/ communication device 302 field interaction.

Figure 1:
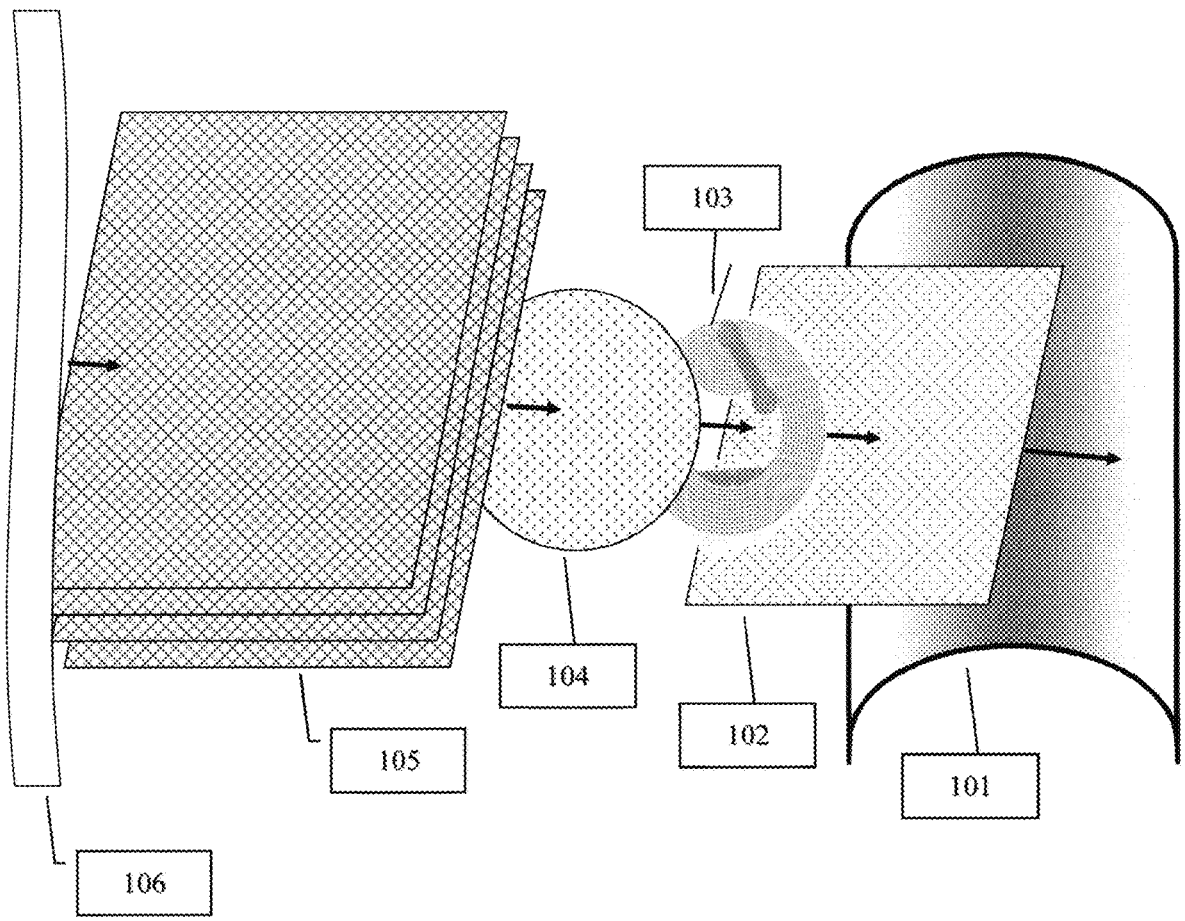
FIG. 1 is an illustration of an exemplary in-mold layering of the communication device and the carbon fibers.
Figure 4:
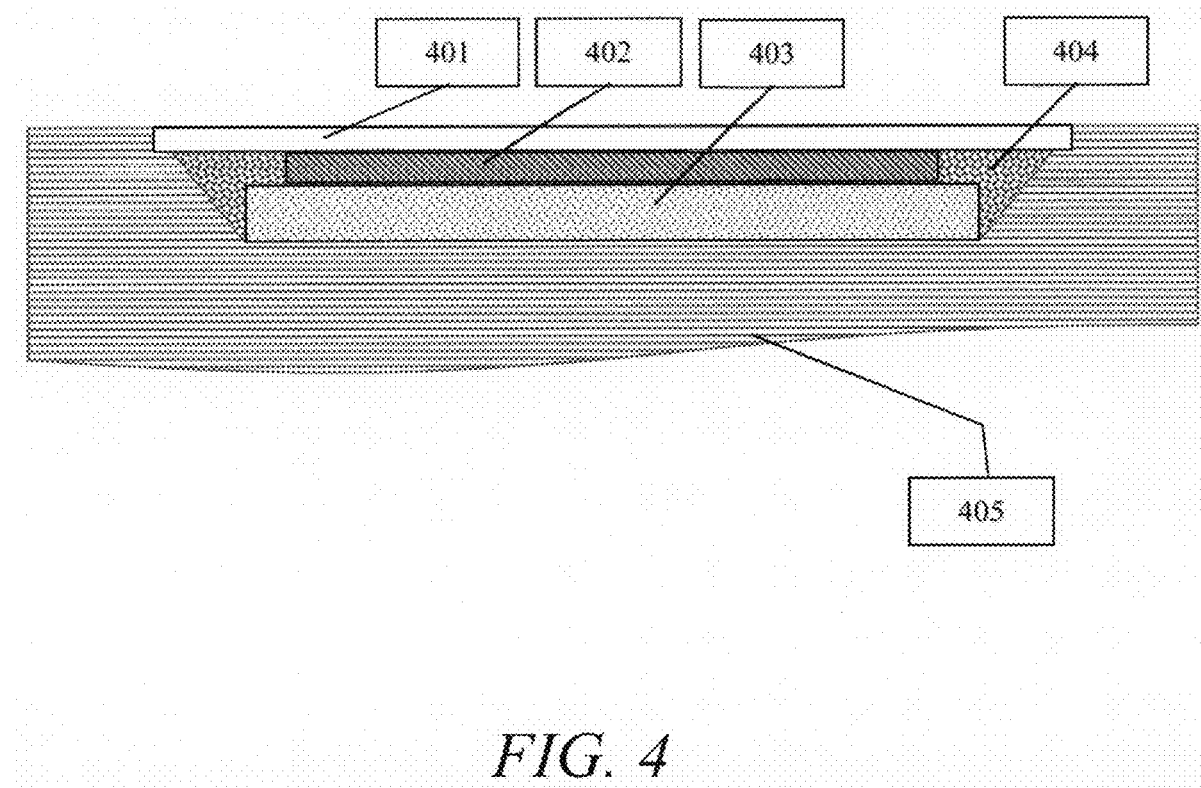
FIG. 4 is an illustration of an integrated communication device in the formed object material.

In one embodiment, the device may include its own protective layer 102, covering the antenna and IC 103 (see FIG. 1). Such a protective layer of the same shape as the rest of the device 103, including the insulation layer shape 104, is adhesively attached atop the antenna layer of the device 103. This integrated protective layer 401 (see FIG. 4) can consist of different materials, such as PET, paper, or other fibers. In one embodiment, the protective layer 401 consists of fabric-like woven fibers with low surface energy to allow stronger congealing with the applied resin 404. The determining property for suitability of the protective material is whether its conductivity and thickness are sufficiently low to avoid dampening the electromagnetic field from the interrogating device 602 to a level that would be insufficient to power the communication device 604 (see FIG. 6). The protective layer may be a resin-infused fiber such as resin-infused glass fiber, resin-infused carbon fiber, resin-infused cellulose fiber, resin-infused biofiber or resin-infused synthetic fiber. The resin-infused synthetic fiber may contain a fiber made of polymer fiber, like acrylic fiber. The resin-infused biofiber may contain fiber made of Rayon, Lyocell (a form of Rayon that consists of cellulose fiber), Modal (a semi-synthetic cellulose fiber), polylactic acid (PLA) or cellulose fiber.

Third, the final product molding process is adopted to assure proper fit of the communication device. Specifically, the sequence of layering a protective layer of, for instance, one or more sheets of fiber-glass 504, followed by the communication device and its insulation layer 506, and finished by the desired depth of carbon fiber layers 508 (see FIG. 5).

Fourth, the expandable inner-mold tubing is inserted into the mold to enable proper inner pressure to avoid damaging the communication device during the curing process 510.

Fifth, the molding curing is framed by choosing proper temperatures and curing times to avoid damage to the communication device 520.

Sixth, after the product is cured and removed from the mold 522, the product is finished through abrasion or additional final coatings to avoid damage to the communication device 524.

The carbon-based product is now equipped with the embedded communication device that can be read by the interrogator. The communication device is protected from product use and tempering and can be made invisible through paint or other non-carbon and non-metallic coatings without the loss of communication properties.

One of the most important and novel aspects of this invention is the combination of materials not suited for remote frequency communication with near field communication devices.

Use

A bicycle manufacturer wants to integrate an anti-counterfeiting and consumer engagement system with their bicycles. An NFC-based RFID system (see FIG. 6) is chosen because of readability with most modern smart phones, i.e. the interrogation devices 602. In order to make the communication device 604 a part of the bicycle frame 601, resistant to tempering, product use, and still invisible from the outside, the communication device 604 has to be embedded into the frame material 405 itself.

Communication Device

Figure 2:
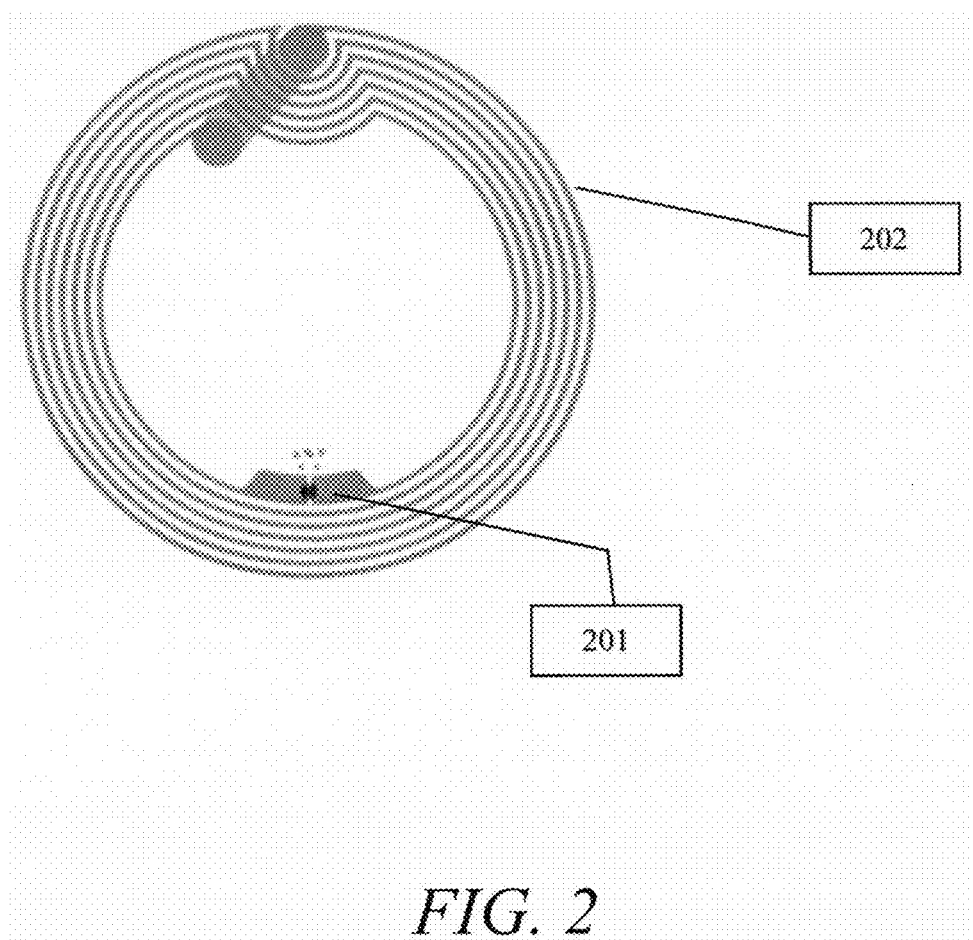
FIG. 2 is an illustration of a near field communication device, or NFC tag, including an integrated circuit and an antenna.

The bicycle manufacturer uses standard ISO-based chipsets 201 and antennas 202 to communicate with the interrogating mobile phones 602. The antenna size 202 is chosen to ensure a certain read-range, in typical NFC implementations the effective read-range can be up to 10 cm, and the chipset 201 to ensure sufficient memory for bicycle identification purposes (see FIG. 2).

Placement

A position for the communication device 604 on the bicycle frame 601 is chosen that prevents excessive warping or bending of the antenna 202, for instance, the object's surface diameter on rounded surfaces should be larger than 25 mm. Yet, the positioning should be easily accessible for later scanning by the interrogation device, a mobile phone or tablet 501.

Layering and Molding Process

The communication device 103 is now attached to an insulation layer of poly-carbonate 104 with slightly larger dimensions than the antenna, about 1 mm on each side 202.

During the production process, the placement position is marked in the bicycle frame mold 101 (see FIG. 1). Into that position, an oversized resin-infused fiber glass protective layer 102 or similar resin-infused fiber protective layer is placed, followed by the communication device with antenna 103 and insulation layer 104, all smaller than and completely inside the fiber glass layer 102, followed by the raisin-infused carbon fiber layers 105 to the thickness as the rest of the frame. The resin-infused fiber may be resin-infused glass fiber, resin-infused carbon fiber, resin-infused cellulose fiber, resin-infused biofiber or resin-infused synthetic fiber. The resin-infused synthetic fiber may contain a fiber made of polymer fiber, like acrylic fiber. The resin-infused biofiber may contain fiber made of Rayon, Lyocell (a form of Rayon that consists of cellulose fiber), Modal (a semi-synthetic cellulose fiber), polylactic acid (PLA) or cellulose fiber.

Finally, expandable tubing 106 is placed inside the mold and the mold is closed.

Resin Heating and Curing of the Carbon Fiber Material

Now the whole mold 520 is heated to a temperature necessary to liquefy the resin 404 particles embedded in carbon 105 and glass fiber 102 layers to eventually harden the carbon and fiber layers into their final shape. The inner-mold tubes 106 are expanded to press the fiber layers 102 against the mold walls with the necessary pressure. The pressure used in production processes is usually comparatively small (200 kPa) and remain well below a pressure that can damage the communication device (1 MPa at least).

The mold 101 is heated to a temperature that liquefies the raisin 404 particles in both carbon 405 and glass fibers 401. Temperatures range depending on the raisin, but are typically between 90-160° C. The method described here requires the heating temperature to be below the melting temperature of the soldering metal (solder) used to produce the conductors of the communication device 402, typically far above 160° C. For example, standard solder formulations based on tin and lead (63/37) melt at 183° C. and tin and lead solder (50/50) has a melting point of up to 215° C. Lead-free solders melt at around 250° C.

The pressure of the expandable tubing 106 now presses the liquefied raisin 404 in between the glass 401 and carbon fibers 405 and around the communication device 402 and insulation layer 403. The pressure also puts the fiber layers 401, 405 into their final mold shape 101, tightly around the communication device 402, and onto each other (see FIG. 4). The following cooling process hardens the raisin 404 and substantiates the final form or the carbon-fiber based product, including the embedded communication device 402.

Integrated Communication Device Communicates with Interrogating Devices

Figure 6:
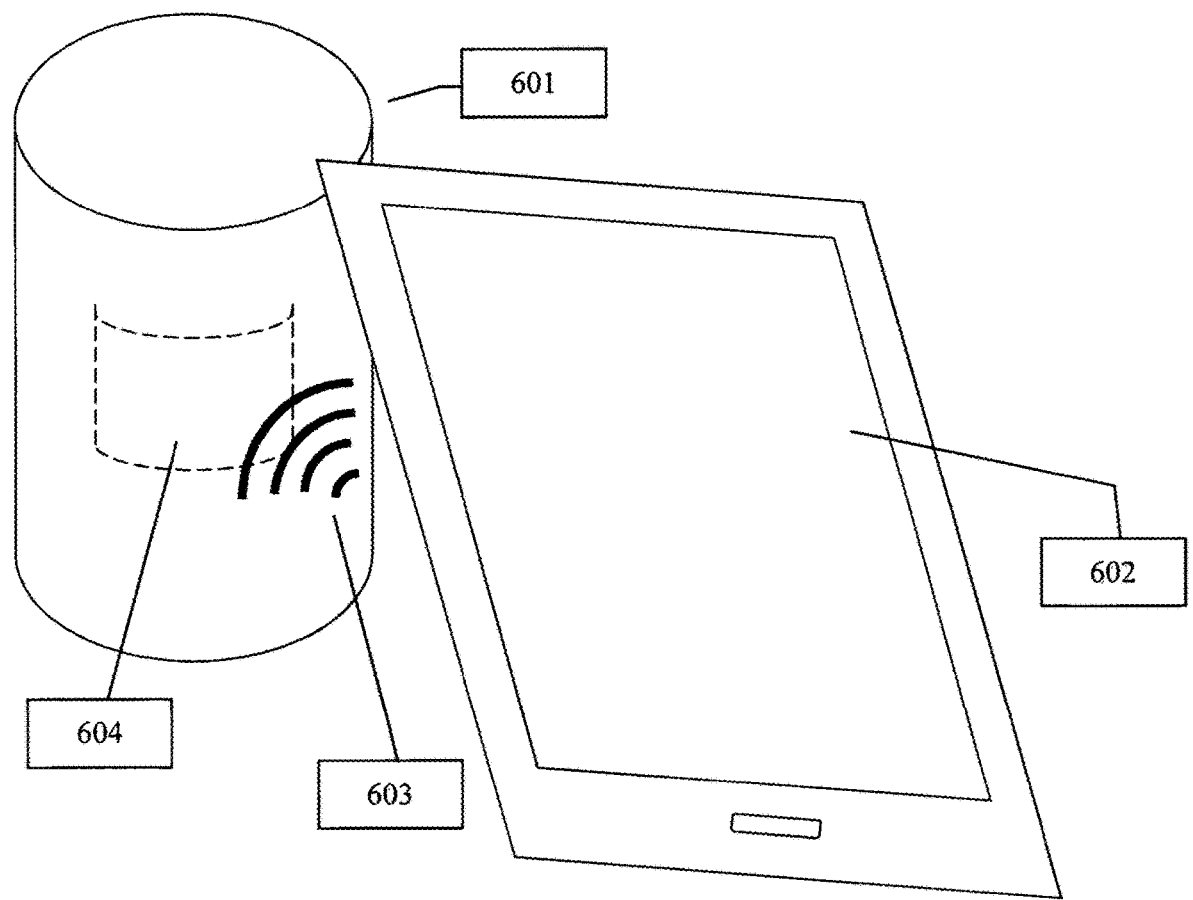
FIG. 6 is an illustration of how an interrogation device communicates with the communication device embedded in the physical object.

After removing the final product from the mold 522, the communication device can now be scanned by an interrogator device like a computer tablet or mobile phone (see FIG. 6). The communication device can even be used in the following production steps to communicate the specifics of the product or advice operators and machines on operational procedures.

Further Processing

Since the communication device is protected by a layer of fiber glass 401 or similar resin-infused fiber with low conductivity, which compared to carbon fiber 405, has very little effect on the electro-magnetic field of the interrogating device, the product can even be processed further 524, like application of light abrasion to smoothen the surface. Even additional paint layers are possible while assuring the communication function of the embedded device.

What is claimed is:

1. A communication device that may be flush mounted on an object made of carbon fiber material comprising:
    a near field communication chipset or radio frequency identification chipset that may be read by an interrogation device;
    an antenna connected to said near field communication chipset or radio frequency identification chipset;
    a carrier film, wherein said near field communication chipset or radio frequency identification chipset and antenna are provided in said carrier film;
    an insulation layer wherein said carrier film containing said near field communication chipset or radio frequency identification chipset and antenna is mounted on said insulation layer to form said communication device, wherein said insulation layer is able to absorb frequencies utilized by said communication device and interrogation devices and made of non-conductive material; and
    a protective layer, wherein said protective layer is made of a material with low electromagnetic shielding capability, wherein said material with low electromagnetic shielding capability is a resin or resin-infused fiber.

2. The communication device according to claim 1, wherein said resin-infused fiber is carbon fiber, glass fiber, biofiber, cotton fiber, synthetic polymer fiber, or cellulose fiber.

3. The communication device according to claim 1, wherein said communication device utilizes near field communication (NFC) radio frequency.

4. The communication device according to claim 3, wherein said NFC radio frequency is about 13.5 MHz.

* * * * *